US012121479B1

(12) United States Patent
Wilson et al.

(10) Patent No.: US 12,121,479 B1
(45) Date of Patent: Oct. 22, 2024

(54) STRAP AND RELEASE SYSTEM

(71) Applicant: Turn Medical, LLC, San Antonio, TX (US)

(72) Inventors: Kevin S. Wilson, San Antonio, TX (US); Eric W. Barta, Castle Hills, TX (US); Christopher T. Niederkrom, San Antonio, TX (US)

(73) Assignee: Turn Medical, LLC, San Antonio, TX (US)

( * ) Notice: Subject to any disclaimer, the term of this patent is extended or adjusted under 35 U.S.C. 154(b) by 0 days.

(21) Appl. No.: 17/723,333

(22) Filed: Apr. 18, 2022

Related U.S. Application Data

(60) Provisional application No. 63/176,153, filed on Apr. 16, 2021.

(51) Int. Cl.
*A61G 13/00* (2006.01)
*A61G 13/04* (2006.01)
*A61G 13/12* (2006.01)

(52) U.S. Cl.
CPC ............ *A61G 13/12* (2013.01); *A61G 13/04* (2013.01)

(58) Field of Classification Search
CPC ......... A61G 13/00; A61G 13/12; A61G 13/04
See application file for complete search history.

(56) References Cited

U.S. PATENT DOCUMENTS 2,947,514 A 8/1960 Goss
3,416,816 A 12/1968 Spencer
3,681,797 A 8/1972 Messner
4,391,009 A 7/1983 Schild
4,526,165 A * 7/1985 Mielnik, Jr. ........... A61G 13/12 128/882
4,545,573 A * 10/1985 Murphy ................. A61G 13/12 5/624
4,729,598 A 3/1988 Hess
4,947,496 A 8/1990 Connolly
5,249,320 A 10/1993 Moretz
5,412,821 A 5/1995 Wilkinson
5,487,196 A 1/1996 Wilkinson
5,738,675 A * 4/1998 Botimer ................ A61F 5/3769 5/624
5,774,956 A * 7/1998 French ................ A44B 11/266 24/616
5,794,288 A 8/1998 Soltani
5,870,785 A 2/1999 Hoorens
5,882,349 A 3/1999 Wilkerson
(Continued)

FOREIGN PATENT DOCUMENTS

DE 202005007453 U1 10/2005
EP 1987806 6/2009
(Continued)

*Primary Examiner* — Fredrick C Conley
(74) *Attorney, Agent, or Firm* — Pizarro Allen PC

(57) ABSTRACT

A therapeutic apparatus, such as a proning type bed or table, may include a plurality of support packs. The support packs may be disposed on support assemblies or arms that may be extended across the patient's body and connected so as to help support the patient during rotation. To connect the support assemblies together the assemblies may comprise securement straps and a connector. The support assemblies may further comprise a release lever so as help relax tension in a securement strap so as to help a user quickly release the connector.

7 Claims, 4 Drawing Sheets

(56) References Cited

U.S. PATENT DOCUMENTS

| | | | | |
|---|---|---|---|---|
| 5,926,884 | A | 7/1999 | Biggie | |
| 6,065,165 | A | 5/2000 | Delk | |
| 6,108,838 | A | 8/2000 | Connolly | |
| 6,212,718 | B1 | 4/2001 | Stolpmann | |
| 6,282,736 | B1 | 9/2001 | Hand | |
| 6,367,106 | B1 | 4/2002 | Gronsman | |
| 6,499,160 | B2 | 12/2002 | Hand | |
| 6,526,610 | B1 | 3/2003 | Hand | |
| 6,566,833 | B2 | 5/2003 | Bartlett | |
| 6,609,260 | B2 | 8/2003 | Hand | |
| 6,619,382 | B1 | 9/2003 | Ichigaya | |
| 6,671,905 | B2 | 1/2004 | Bartlett | |
| 6,691,347 | B2 | 2/2004 | Hand | |
| 6,701,553 | B1 | 3/2004 | Hand | |
| 6,701,556 | B2 | 3/2004 | Romano | |
| 6,715,169 | B2 | 4/2004 | Niederkrom | |
| 6,728,983 | B2 | 5/2004 | Bartlett | |
| 6,817,363 | B2 | 11/2004 | Biondo | |
| 6,862,759 | B2 | 3/2005 | Hand | |
| 6,862,761 | B2 | 3/2005 | Hand | |
| 6,874,181 | B1 | 4/2005 | Vijayendran | |
| 6,934,986 | B2 | 8/2005 | Krywiczanin | |
| 7,017,211 | B2 | 3/2006 | Krywiczanin | |
| 7,137,160 | B2 | 11/2006 | Hand | |
| 7,191,480 | B2 | 3/2007 | Romano | |
| 7,191,482 | B2 | 3/2007 | Romano | |
| 7,219,379 | B2 | 5/2007 | Krywiczanin | |
| 7,322,059 | B2 | 1/2008 | Hornbach | |
| 7,455,744 | B2 | 11/2008 | Mileti | |
| 7,469,432 | B2 | 12/2008 | Chambers | |
| 7,469,436 | B2 | 12/2008 | Meyer | |
| 7,472,440 | B2 | 1/2009 | Bartlett | |
| 7,478,869 | B2 | 1/2009 | Lazanja | |
| 7,480,953 | B2 | 1/2009 | Romano | |
| 7,578,552 | B2 | 8/2009 | Bajic | |
| 7,617,555 | B2 | 11/2009 | Romano | |
| 7,712,164 | B2 | 5/2010 | Chambers | |
| 7,914,611 | B2 | 3/2011 | Vrzalik | |
| 7,937,791 | B2 | 5/2011 | Meyer | |
| 7,966,680 | B2 | 6/2011 | Romano | |
| 7,992,239 | B2 | 8/2011 | Hornbach | |
| 8,011,041 | B2 | 9/2011 | Hann | |
| 8,118,920 | B2 | 2/2012 | Vrzalik | |
| 8,372,182 | B2 | 2/2013 | Vrzalik | |
| 8,601,620 | B2 | 12/2013 | Romano | |
| 8,856,993 | B2 | 10/2014 | Richards | |
| 8,893,338 | B2 | 11/2014 | McCausland | |
| 8,997,287 | B2 | 4/2015 | Lanning | |
| 9,009,892 | B2 | 4/2015 | Lachenbruch | |
| 9,131,780 | B2 | 9/2015 | Lachenbruch | |
| 9,254,231 | B2 | 2/2016 | Vrzalik | |
| 9,433,300 | B2 | 9/2016 | Gibson | |
| 9,462,893 | B2 | 10/2016 | Romano | |
| 9,463,124 | B2 | 10/2016 | Lachenbruch | |
| 9,538,853 | B2 | 1/2017 | Vrzalik | |
| 9,730,847 | B2 | 8/2017 | Lachenbruch | |
| 9,835,344 | B2 | 12/2017 | Vrzalik | |
| 9,907,408 | B2 | 3/2018 | Vrzalik | |
| 9,913,770 | B2 | 3/2018 | Lachenbruch | |
| 10,172,470 | B1 | 1/2019 | Vrzalik | |
| 10,265,231 | B2 | 4/2019 | O'Reagon | |
| 2002/0138905 | A1 | 10/2002 | Bartlett | |
| 2002/0138906 | A1* | 10/2002 | Bartlett | A61G 7/008<br>5/609 |
| 2004/0168253 | A1 | 9/2004 | Hand | |
| 2004/0226091 | A1 | 11/2004 | Hand | |
| 2005/0022308 | A1 | 2/2005 | Totton | |
| 2005/0081300 | A1 | 4/2005 | O'Reagan | |
| 2005/0086739 | A1 | 4/2005 | Wu | |
| 2005/0229317 | A1 | 10/2005 | Heiser | |
| 2006/0010608 | A1 | 1/2006 | DeFranks | |
| 2006/0016007 | A1 | 1/2006 | Hornbach | |
| 2006/0112491 | A1 | 6/2006 | Buehner | |
| 2006/0112826 | A1 | 6/2006 | Ichigaya | |
| 2007/0261548 | A1 | 11/2007 | Vrzalik | |
| 2009/0056030 | A1 | 3/2009 | Bolden | |
| 2010/0000061 | A1* | 1/2010 | Gopal | A44B 11/125<br>24/68 CD |
| 2010/0146709 | A1 | 6/2010 | Lafleche | |
| 2010/0274331 | A1 | 10/2010 | Williamson | |
| 2010/0293713 | A1* | 11/2010 | Sharps | A61G 7/1057<br>5/83.1 |
| 2011/0024076 | A1 | 2/2011 | Lachenbruch | |
| 2011/0308020 | A1 | 12/2011 | Vrzalik | |
| 2013/0074272 | A1 | 3/2013 | Lachenbruch | |
| 2013/0198955 | A1 | 8/2013 | Lishnevsky | |
| 2013/0212808 | A1 | 8/2013 | Lachenbruch | |
| 2013/0298330 | A1 | 11/2013 | Lachenbruch | |
| 2015/0164725 | A1* | 6/2015 | Wilson | A61B 6/0421<br>128/845 |
| 2017/0007482 | A1 | 1/2017 | McKnight | |

FOREIGN PATENT DOCUMENTS

| | | |
|---|---|---|
| EP | 3424478 | 1/2019 |
| WO | 1997018157 | 5/1997 |

* cited by examiner

STRAP AND RELEASE SYSTEM

CROSS-REFERENCE TO RELATED APPLICATIONS

This application claims priority to U.S. Provisional Patent Application No. 63/176,153 titled "Strap and Release System" filed Apr. 16, 2021. The full disclosure of the aforementioned patent application is herein fully incorporated by reference.

FIELD

This invention relates to patient support for prone therapy.

BACKGROUND

There is a need for systems for releasing tension in a strap system used to secure a patient in prone packs of a therapeutic bed.

SUMMARY

In some embodiments, therapeutic bed may comprise a frame configured for rotation of a patient; a prone pack coupled to the frame, the prone pack being disposed so as to retain a patient when in the prone position; and a strap system for securing the prone pack against the patient, the strap system comprising a connector and a release lever configured to release tension in the strap system.

DETAILED DESCRIPTION

This disclosure is directed to a strap and release system for therapeutic beds configured for prone therapy. To provide context for describing the structure and function of various embodiments of a patient inner leg support, the disclosure turns first to an overview of an embodiment of a therapeutic bed in which a patient inner leg support may be suitably provided.

Therapeutic Bed

Figure 1:
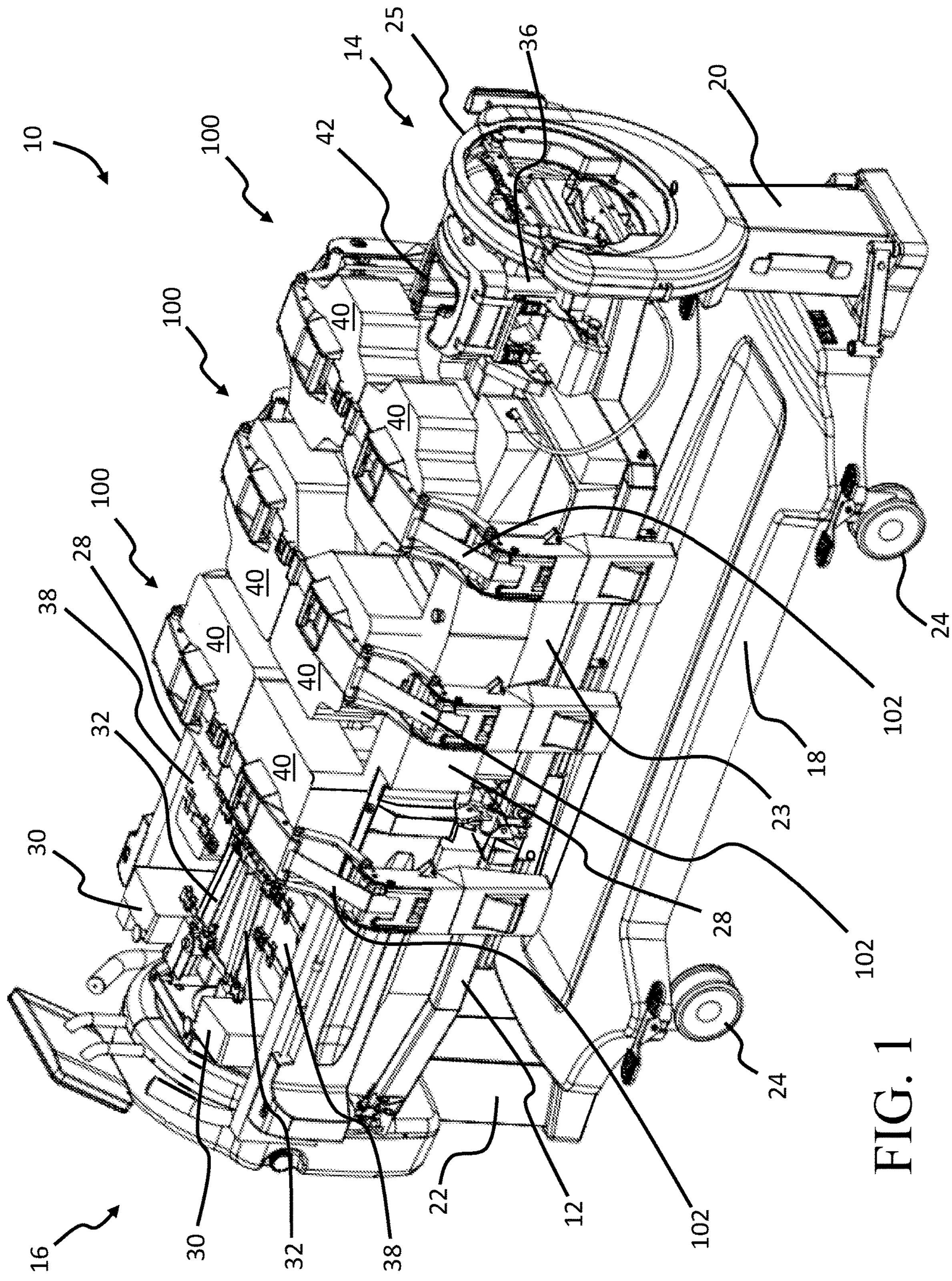
FIG. 1 illustrates an embodiment of a therapeutic bed configured for prone therapy.

FIG. 1 illustrates an embodiment of a therapeutic bed 10 configured to support a patient (not shown) for prone therapy and/or kinetic therapy. Therapeutic bed includes a patient support frame 12 having a head end 14 and a foot end 16. The patient support frame is coupled to a caster frame 18 by a first lift column 20 at the head end and by a second lift column 22 at the foot end. The caster frame may be supported by a plurality of casters 24 for bed mobility.

The therapeutic bed embodiment of FIG. 1 may move a patient through primarily two therapeutic modes of movement: a rotational mode and a tilt mode. To provide a rotational mode of movement, the patient support frame may be rotated about a long axis extending through the foot end and the head end of the patient support frame. The rotational mode of movement permits a patient to be rotated from a supine (face up) orientation to a prone (face down) orientation. The rotational mode of movement may further permit a patient to be oscillated through a range of angular positions in either or both of the supine or prone orientations. The rotational mode of movement may further permit rotation through more or less than 360°.

To permit rotational movement, the patient support frame may be rotatably coupled to the lift columns. For example, the foot end of the patient support frame may be coupled to lift column 22 by any suitable means, such as through a plate or saddle (not shown). Other suitable means for providing rotatable coupling between the lift column 22 and patient support frame may be used, such as those described in U.S. Pat. No. 6,862,759, for example, which is herein incorporated by reference. The head end of the patient support frame may comprise a hoop 25, which may be coupled to a lift column 20 using any suitable means. For example, the patient support frame may rest on a roller support coupled to a saddle (not shown) with the saddle coupled to the lift column 20. A drive system (not shown), such as an electrical motor and drive belt, and electronic controls may be used to selectively rotate the patient support frame. Of course, other suitable means for rotatably coupling the patient support frame and lift column 20 may be used. In some modes of operation, the patient support frame may be manually rotated.

To provide a tilt mode of movement, the length of each lift column may be independently adjusted so as to raise and lower the head end of the patient support frame independently of the foot end, or to raise and lower the foot end of the patient support frame independently of the head end. Furthermore, the length of each lift column may be adjusted so as to raise or lower the entire patient support frame with respect to the caster frame. That is, the distance between either or both end of the patient support frame and the caster frame may be adjusted. To permit tilt movement, lift column height may be adjusted by any suitable mechanism, such as by hydraulics, screw, ratchet or removable pin.

Patient Constraint

When the patient support frame is oriented to support a patient in a supine position, the patient may rest on one or more patient support pads 23 disposed on the patient support frame 12. However, when the patient support frame is moved through one or more modes of movement, the patient must be constrained from sliding or falling from the patient support frame. A variety of packs may be provided to constrain a patient during bed movement.

A plurality of lateral packs may constrain the patient's legs, torso, arms and head from lateral movement with respect to the patient support surface. Such lateral packs may include, for example, side support packs 28, foot packs 30, abductor packs 32, and head packs 36. Various embodiments of a patient inner leg support, or abductor support, having abductor packs are described in more detail below.

A plurality of prone packs may prevent a patient from falling from the bed when the patient is rotated to a prone position. Such prone packs may include, for example, leg packs 38, torso or thigh packs 40 and a face pack 42.

The term "pack" as used herein refers to a structure that is firm enough to substantially maintain its shape while supporting the patient's body but is also soft so as to comfortably support the patient's body. A pack may, for example, be comprised of a rigid support panel or other structure surrounded by a padding. A pack may be comprised of one or more layers. A pack may comprise a single type of padding. Alternatively, a pack may comprise several different padding materials such as may be used such as to provide a desired level of support in different parts of a pack. For example, a pack may be comprised of materials with more than one spring rate or initial force deflection rating so as to control a level of immersion of the pack around the patient's body. A pack may be shaped to receive a part of the patient's body. For example, a support pack may be generally shaped to contour a patient's legs, forehead, cheeks, or other body part against which it is designed to be disposed. In some embodiments, a pack may be shaped and/or made of materials with controlled properties (e.g., initial force deflection, spring rate, and other properties) so as to reduce any shearing stresses that tend to be formed on the patient's skin when a patient's body is immersed in the pack. A pack may, for example, be filled with a pressurized gas (such as air), foam, a gel, a viscous fluid, or another suitable material.

Patient Access

When the patient support frame is rotated to orient a patient in the prone position, a caregiver may require access to the patient through the patient support frame. The patient support frame may be provided with panels that a caregiver may open to allow access to the patient's body.

Support Release

In view of the foregoing context, a more detailed description of various embodiments of a patient support pack release system may now be provided. However, the foregoing embodiments of therapeutic beds and various features and functions thereof should not be interpreted as limiting. Any patient support pack release system as described herein may be used with any therapeutic bed in which a patient may be positioned or placed in a prone or face down position or in which a patient may be treated with rotation therapy.

A prone pack arm assembly 100 may include a torso or thigh pack 40 and may be mounted to the therapeutic bed 10 as described U.S. application Ser. No. 17/723,249, titled "Stowable Patient Supports" and filed Apr. 18, 2022, which is herein incorporated by reference. The prone pack arm assembly 100 is configured to position the torso or thigh pack 40 over the body and/or limbs of the patient (not shown). A plurality of prone pack arm assemblies 100 may be used for each therapeutic bed 10. Prone pack arm assemblies 100 may be used singly or in pairs. As may be seen in the embodiment of FIG. 1, prone pack arm assemblies 100 may be used in pairs, with each prone pack arm assembly of the pair being mounted to an opposite side of the therapeutic bed and joined approximately at the midline of the patient.

Figure 2:
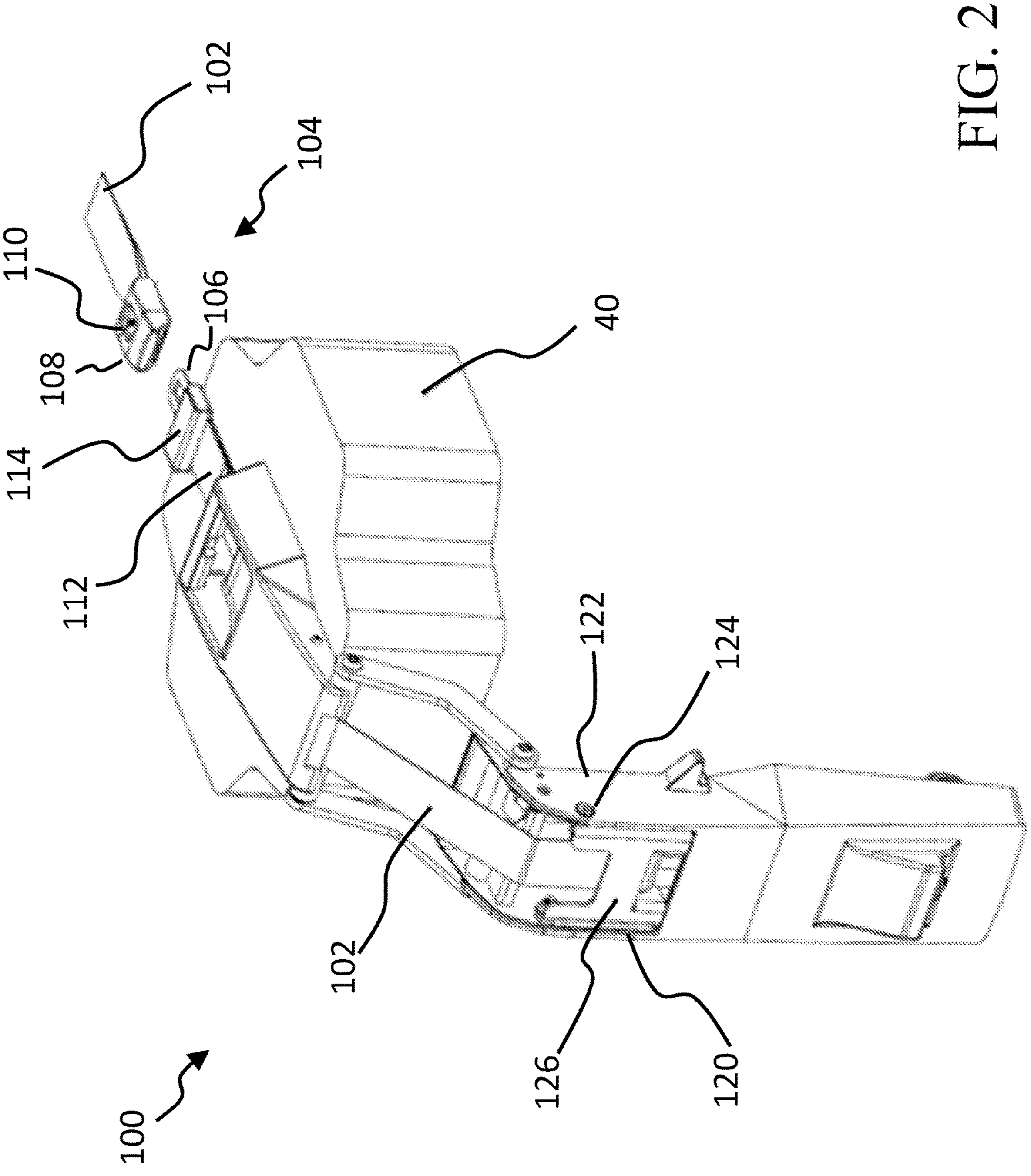
FIG. 2 illustrates a prone pack arm assembly having a release lever in a closed position.

Regardless of whether used singly or in pairs, the prone pack arm assemblies 100 and associated torso or thigh packs 40 may be secured over the patient by a strap system. In the embodiment of FIG. 1, pairs of prone pack arm assemblies 100 and torso or thigh packs 40 are used in opposing orientation, with each of the pair being positioned to restrain one or the other of the left and right sides of the patient. One of the pair of prone pack arm assemblies 100 is illustrated in FIG. 2. The strap system comprises a plurality of straps sections 102 joined by a connector 104, such as a quick-release connector, automotive seatbelt-style buckle, a side-release buckle, or a stab-lock style buckle. For example, as shown in FIG. 2, a first strap section and a second strap section may be aligned so that a buckle clip 106 may be engaged with a buckle receiver 108 so that the first strap section and the second strap section may be held together (see FIG. 1). In the embodiment of FIG. 2, the connector 104 is an automotive seatbelt-style buckle comprising a buckle clip 106 and a buckle receiver 108. Inserting the buckle clip 106 into the buckle receiver 108 will securely engage the buckle. A button 110 may be depressed to release the buckle clip 106 from the buckle receiver 108.

The strap system may include one or more strap tensioners such as a ratchet or cam lock that will prevent the strap system from loosening. In the embodiment of FIG. 2, the tensioner 114 couples the buckle clip 106 to one of the strap sections shown therein and permits the strap system to be tightened. A free end 112 of a strap section may be passed through the tensioner 114. The strap system may be tightened by pulling the free end 112 of a strap section through the tensioner 114. Releasing tension on the free end 112 will cause the tensioner 114 to engage, thereby preventing the free end 112 from slipping back through the tensioner. A button 110 on the buckle receiver 108 may be depressed to release the buckle.

In the embodiment of FIG. 1, the connector 104 (e.g., the buckle) is approximately positioned along the long central axis of the therapeutic bed 10, which corresponds roughly to the midline of the patient. In this configuration a pair of torso or thigh packs 40 may be joined together using the strap system. The prone pack arm assemblies 100 of which the torso or thigh packs 40 are included may be about the same size and weight so as to reduce strain on caregivers tasked with moving and stowing the supports. One or more sensors (not shown) may be used to verify that the strap system is properly secured in place so as to help ensure that the patient is properly supported when rotated or held in place in a prone position.

The strap system includes one or more release levers by which strap tension may be eased. As may be seen in FIG. 2, a release lever 120 may be pivotably coupled to an arm 122 of the prone pack arm assembly by a pin 124 or other pivotable fastener. In the embodiment of FIG. 1, a strap section for the prone pack arm assembly 100 is coupled to the release lever 120 and to the connector 104.

Figure 3:
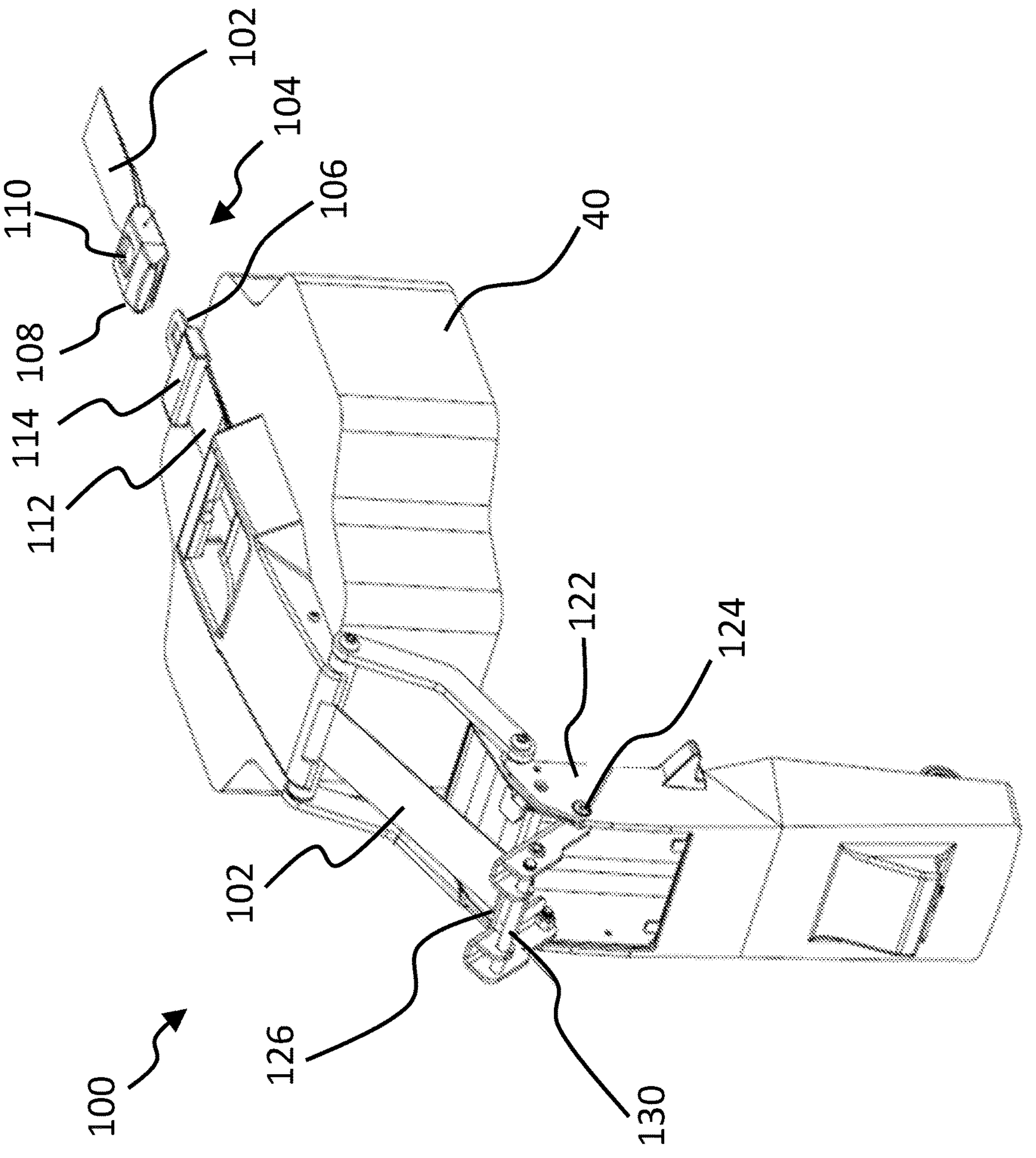
FIG. 3 illustrates the prone pack arm assembly of FIG. 2 in which the release lever in an open position.

The release lever 120 is operable between open and closed positions. In the "closed" position (as shown in FIG. 2), the release lever 120 is positioned along the arm 122 such that the point of attachment of the plurality of strap sections 102 to the release lever 120 is maximally distant (along the length of the strap section shown) from the connector 104. In the "open" position (as shown in FIG. 3), the release lever 120 is pivoted away from the arm 122 such that tension in the strap 102 may be released. With the release lever 120 in the closed position, the connector 104 may be engaged and the straps tightened. Strap tension tends to urge the buckle clip 106 and buckle receiver 108 apart. In particular, excessive tension applied to straps used with connectors (such as, for example, quick-release connectors which may require only a single action to release, like depressing a button or squeezing side tab releases) may increase difficulty in releasing the connector 104. The seatbelt-style buckle disclosed here, for example, includes a prong or other structure that is secured in a catch. Depressing the button 110 will release the prong from the catch. Increasing tension on the strap sections 102 makes operation of the release button 110 more difficult.

Therapeutic beds may use sensors to indicate that the strap system securely holds support packs in place. However, sensor systems may be prone to falsely indicating a loose strap. As a result, and to overcome general hesitancy of caregivers when rotating patients, caregivers often over tighten the prone pack securement straps. When the straps are over tightened, tension on the buckle is such that the release button on the buckle can no longer be actuated to release the buckle, thus separating the two halves of the buckle is made difficult. This may be particularly difficult when the buckles are disposed generally along the center of the therapeutic bed such that a user must reach over the bed when attempting to release the buckles. Thus, the release levers may be positioned away from the buckles to a more accessible position, such as at the side of the therapeutic bed on the prone pack arm assembly.

Patients subject to proning or other rotational therapies may commonly be in a very critical condition. It is not uncommon for prone therapy patients to require lifesaving CPR. When CPR becomes necessary, it is important to be able to place the patient in the supine position and gain access to the chest and abdomen very quickly. If a caregiver is not able to release the securement straps due to excess strap tension, the caregiver cannot gain access to the patient in order to provide therapy without cutting or unbolting the straps.

Thus, release levers provide a quick way to release strap tension before a user engages with the connector so that strap sections held together by the connector may be disconnected. In the embodiment shown in FIG. 2, a release lever 120 may be coupled to the arm 122 to position the release lever 120 on the side of therapeutic bed. In some embodiments, the release lever 120 may be pivotably coupled to the patient support frame 12 rather than to the prone pack arm assembly 100.

To secure a patient for proning, opposing prone pack arm assemblies 100 may be secured by buckling the straps 102 together. The release lever 120 should be in the closed position. The torso or thigh packs 40 may be tightened onto the patient by pulling the free ends of the straps 112. So secured, the patient may then be rotated to a prone position. The strap system will retain the prone pack arm assemblies 100 so as to prevent the patient from falling out of the therapeutic bed 10.

The patient may be rotated back to a supine position. To more easily release the patient, one or both of the release levers 120 may be moved to the open position, as shown in FIG. 3. The caregiver may move the release lever 120 from the closed position to the open position by using a handle 126 on the lever to lift the lever 120 away from the arm 122. Moving the lever 120 to the open position releases tension in the strap 102, thereby reducing tension in the connector 104 so as to permit easier operation of the buckle release.

Figure 4:
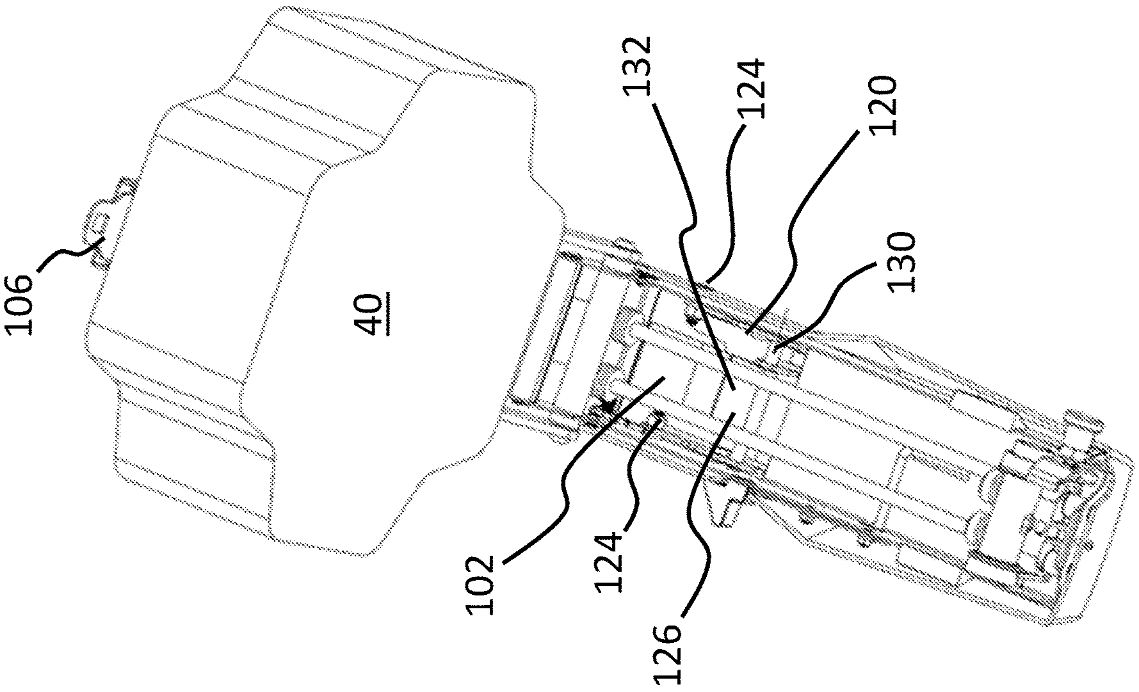
FIG. 4 illustrates another view of prone pack arm assembly of FIG. 2 to better show coupling of a strap to the release lever.

FIG. 4 illustrates a view of the release lever 120 and strap 102 from the reverse side of the prone pack arm assembly 100. The strap may be attached to a bar 130, such as by a sewn loop 132. When the release lever is moved from the closed position (FIG. 2) to the open position (FIG. 3), the loop pivots about the bar. With the release lever 120 in the "open position" the bar is biased toward the strap, which reduces the tension in the strap. With reduced tension in the strap, the buckle release button can be actuated and the two parts of the buckle securing the strap system can be separated for access to the patient. In some embodiments, a removable anchor pin (not shown) may be used to secure the release lever 120 in the closed position to prevent inadvertent movement of the release lever from the closed position to the open position. In order to adjust the position of the release lever 120 between closed and open positions the pin would be removed.

In some embodiments, a ratchet strap may be used in place of or in combination with a release lever 120. For example, a ratchet strap two frames operatively connected by a pivot. The end of the pivot may be ringed with ratchet wheels so as to actuate the ratchet. In other embodiments, a reversible ratchet with a crank, such as may comprise a manual winch, may be used. In some embodiments, a powered strap retractor or a similar powered strap retraction device could also be used.

Although the foregoing specific details describe various embodiments, persons of ordinary skill in the art will recognize that various changes may be made in the details of the disclosed subject matter without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that the disclosed subject matter is not to be limited to the specific details shown and described herein.

What is claimed is:

1. A therapeutic bed comprising:

a frame configured for rotation of a patient;

a first prone pack coupled to the frame, the first prone pack being disposed so as to retain a patient when in a prone position;

a strap system comprising a first strap section, a second strap section, and a connector configured for connecting the first strap section to the second strap section, the strap system configured for engaging with the first prone pack so as to secure the first prone pack against a patient, the strap system further comprising a first release lever configured to release tension in the strap system before disconnecting the first strap section from the second strap section;

the first release lever being pivotable between a first closed position subject to tension in the strap system and a first open position at which at least a portion of the tension is released from the strap system;

a first prone pack arm assembly coupling the first prone pack to the frame, the first prone pack arm assembly comprising a first arm; and the strap system further comprising:

the first release lever being pivotably coupled to the first arm; and wherein the first strap couples the connector to the first release lever.

2. The therapeutic bed of claim 1 wherein the release lever is pivotably coupled to said first arm by a pin.

3. The therapeutic bed of claim 1 wherein the first release lever is positioned at a side of the therapeutic bed and the connector is disposed along the central axis of the therapeutic bed.

4. The therapeutic bed of claim 1, the first release lever lying along the first arm when in the first closed position, and being pivotable away from the first arm to the first open position.

5. The therapeutic bed of claim 4 further comprising:

a second prone pack coupled to the frame, the second prone pack being disposed opposite the first prone pack so as to cooperatively retain the patient when in the prone position; and the strap system engaging the second prone pack so as to secure the second prone pack against the patient, the strap system further comprising a second release lever configured to release tension in the strap system.

6. The therapeutic bed of claim 5, further comprising:

a second prone pack arm assembly coupling the second prone pack to the frame, the second prone pack arm assembly comprising a second arm; and the strap system further comprising:

the second release lever being pivotably coupled to the second arm, the second release lever being pivotable between a second closed position subject to tension in the strap system and a second open position at which at least a portion of the tension is released from the strap system; and the second strap coupling the connector to the second release lever.

7. The therapeutic bed of claim 5, the second release lever lying along the second arm when in the second closed position, and being pivotable away from the second arm to the second open position.

* * * * *